United States Patent [19]
Sims, Jr.

[11] 3,907,236
[45] Sept. 23, 1975

[54] DIVER'S LIFE LINE REEL

[76] Inventor: Dewey M. Sims, Jr., 1342 Windham Dr., Westland, Mich. 48185

[22] Filed: Sept. 13, 1974

[21] Appl. No.: 505,848

Related U.S. Application Data

[63] Continuation-in-part of Ser. No. 275,769, July 27, 1972, abandoned.

[52] U.S. Cl. ............................ 242/85.1; 242/96
[51] Int. Cl.² ............................ B65H 75/34
[58] Field of Search ........... 242/85.1, 96, 54, 77.3, 242/85, 118.8, 136, 140, 141, 170; 2/170, DIG. 6; 9/8, 400

[56] References Cited
UNITED STATES PATENTS

| | | | |
|---|---|---|---|
| 882,431 | 3/1908 | Sonn | 242/118.8 UX |
| 2,683,937 | 7/1954 | Crisswell | 242/85.1 X |
| 3,000,384 | 9/1961 | Piers | 2/DIG. 6 |
| 3,033,487 | 5/1962 | Walker | 242/85.1 |
| 3,136,311 | 6/1964 | Lewis | 2/DIG. 6 |
| 3,705,697 | 12/1972 | Chagnon | 242/96 X |

*Primary Examiner*—John W. Huckert
*Assistant Examiner*—John M. Jillions
*Attorney, Agent, or Firm*—Russel C. Wells

[57] ABSTRACT

An elongated life line reel used by a scuba diver to contain a length of line secured at one end to the reel and at the other end to a float so that at all times the diver's presence is known. As the diver descends the line is unwound or removed from the reel which is secured about his arm or leg by means of a pair of flexible straps respectively attached to the reel by a pair of spring members. The elongated shape of the reel allows the reel to fit securely on the forearm or leg of the diver, contain a long length of line and allow unrestricted movement of the diver in the water. The spring members function to permit easy attaching of the reel to the arm or leg and will operate to maintain the reel about the arm or leg at the different underwater pressures encounted by the diver.

9 Claims, 11 Drawing Figures

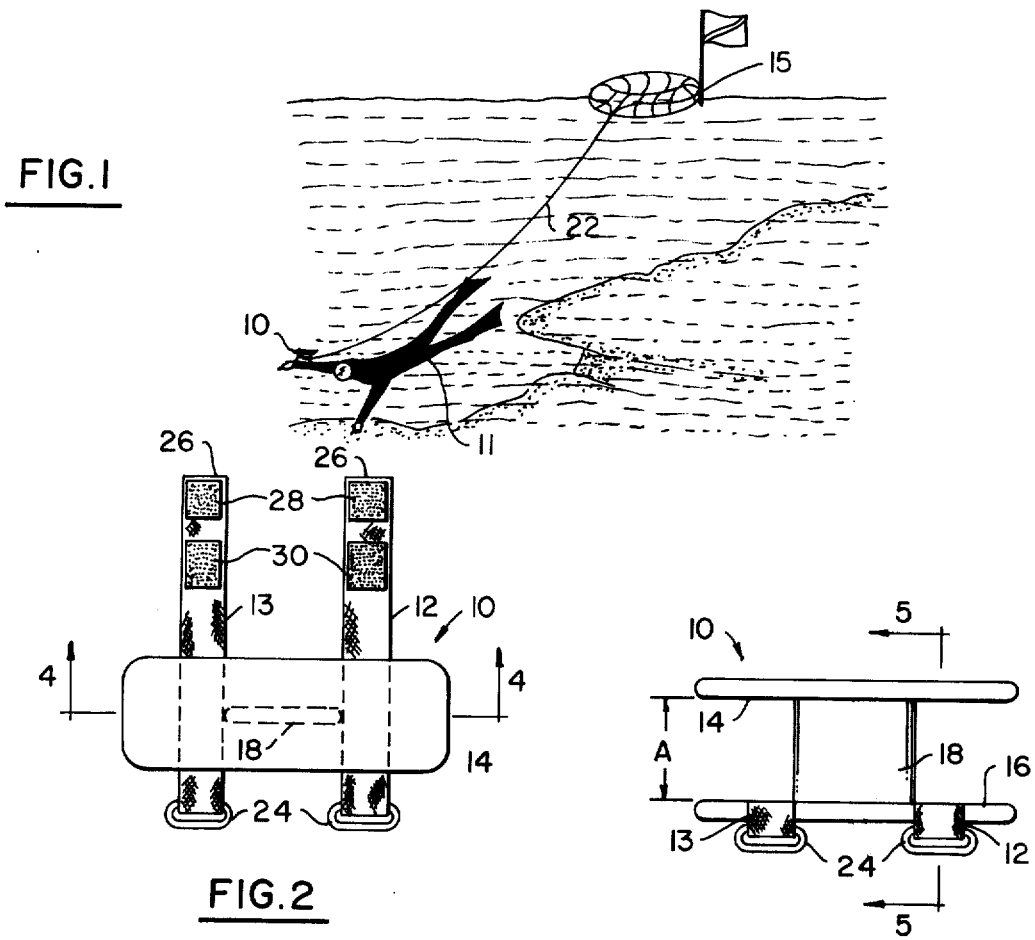
FIG. 1
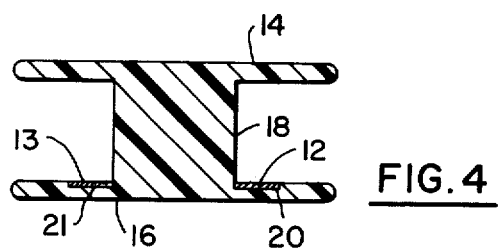
FIG. 2
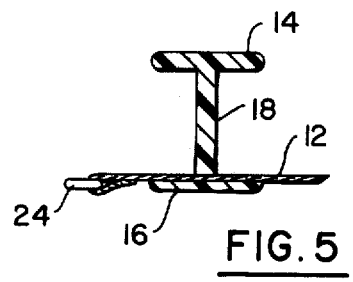
FIG. 3
FIG. 4
FIG. 5
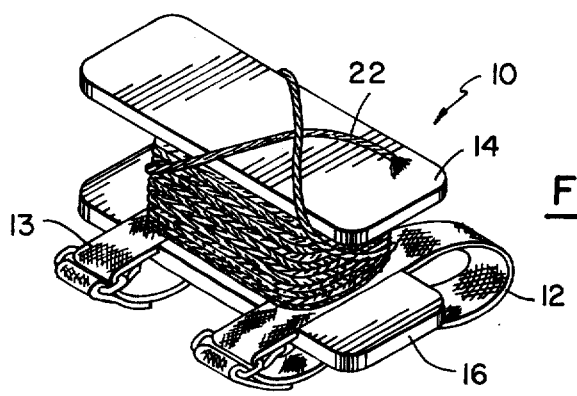
FIG. 6

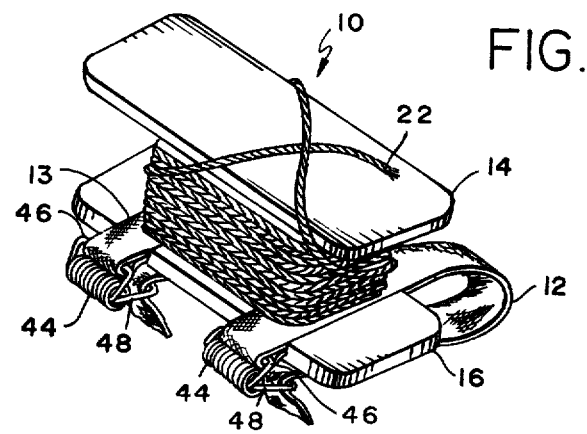
FIG. 7
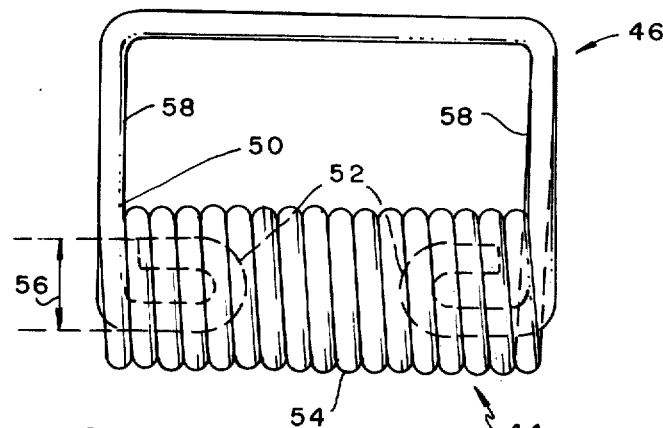
FIG. 8
FIG. 9
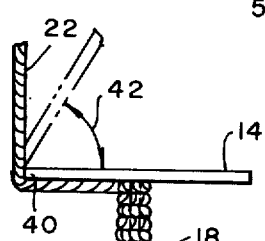
FIG. 10
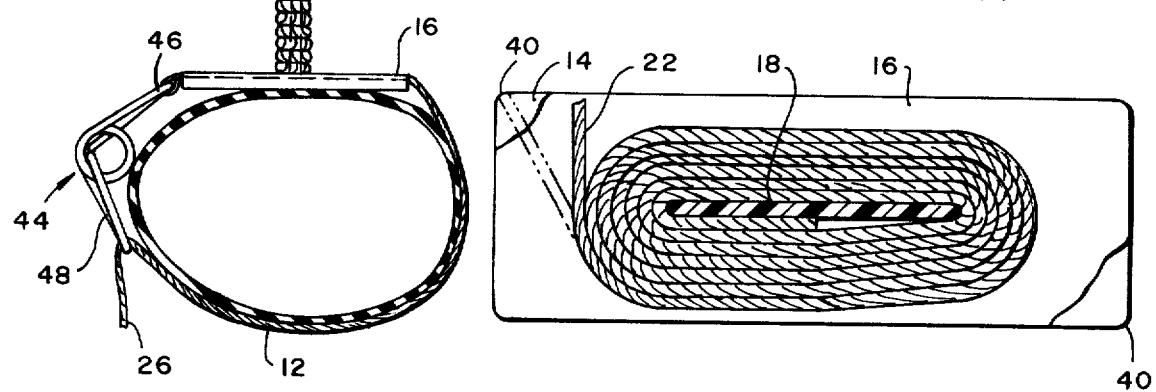
FIG. 11

DIVER'S LIFE LINE REEL

CROSS REFERENCE TO RELATED APPLICATION

This application is a continuation-in-part of my co-pending patent application having Ser. No. 275,769 and filed on July 27, 1972, now abandoned.

BACKGROUND OF INVENTION

1. FIELD OF THE INVENTION

This invention relates to line reels in general and to underwater life line reels for divers in particular.

2. DESCRIPTION OF THE PRIOR ART

It is necessary for safety purposes that all scuba (Self Contained Underwater Breathing Apparatus) divers carry a life line attached at one end to a float on the surface of the water and to themselves at the other end. Several prior art devices and techniques have been used.

One such technique in use today is a coil of line tied at one end to the wrist of the diver and the other end to a float or buoy. As the diver descends he uncoils the line but must at all times carry the excess thereby limiting his underwater activity to the use of one hand.

Another prior art device is a hand held reel or cleat which the diver had to carry and deploy the line with the other hand. When all the line was deployed, the diver still had to hand carry the large reel.

Another prior art device is a large circular reel having a single strap for fastening the reel about the forearm. Large snap clips are positioned on the strap for tieing off the line at any depth. The clips in order to hold the line have a large bias force between the gripping surfaces of the clip which must be opened by the diver. This large bias force presents a difficult operation for a diver to deploy more line or to take up line with one hand. The large size of the reel necessary to hold enough line provides a restriction to movement of the diver under the water. This device allows the line to play out so easily that the diver is not aware of how much line has been deployed. In this manner it is difficult for him to tie off at a predetermined depth.

SUMMARY OF INVENTION

It is a principal object of the invention to provide a low profile reel providing unrestricted movement in the water by a diver.

It is another principal object of the invention to provide a means for constantly maintaining the reel about the diver's arm regardless of the underwater pressures tending to compress his suit.

It is another object of the invention to provide a reel from which line can be deployed with only one hand.

It is still another object of the invention to provide a reel from which the line can be easily tied off by one hand and yet provide a strong clamping action to the tied off line and not allow the line to unravel freely.

These and other objects of the invention will become apparent from the following detailed description taken in conjunction with the drawings wherein an underwater diver's life line reel having a pair of flexible straps respectively connected by a pair of spring members to the reel for securing the reel to the diver's arm or leg is described and claimed. The bottom elongated plate of the reel has a pair of strap receiving means for securing the straps thereto without interferring with the deployment and winding of the line. An upper elongated plate member overlies the lower plate and is connected thereto by a vertical member extending between the longitudinal axes of both members. The interconnecting member is of such a length and width so as to provide a sufficient length of line per coil of line therearound in order to provide a low profile to underwater movement of the diver.

DESCRIPTION OF THE DRAWINGS

In the drawings:

FIG. 1 is a view of a scuba diver utilizing the life-line reel;

FIG. 2 is a top view of the life line reel without line;

FIG. 3 is a plan view of the life line reel in FIG. 2;

FIG. 4 is a section view taken along line 4—4 in FIG. 2 showing the strap and lower plate;

FIG. 5 is a sectional view taken along line 5—5 of FIG. 3;

FIG. 6 is a perspective view of the reel with line wound thereon;

FIG. 7 is a perspective view of another embodiment of the reel showing the pairs of spring members;

FIG. 8 is a plan view of the spring member;

FIG. 9 is a side view of the spring member;

FIG. 10 is a view of the reel of FIG. 7 around the arm of a diver with the spring members working to maintain tension in the straps;

FIG. 11 is a sectional view horizontal to the lower member illustrating the function of the rectangular members functioning as an obstacle to the deployment of the line from the reel.

DETAILED DESCRIPTION

Referring to the Figs. by the characters of reference there is illustrated in FIG. 1 a scuba diver 11 utilizing the reel 10 of the present invention. The reel is secured to the forearm of the diver 11 by means of a pair of flexible straps 12 and 13. Floating on the surface of the water is a tube or float 15 which is secured to the reel by a line 22. The function of reel 10, the line 22 and the float is to locate the diver 11 at all times by his assistant on the surface or to locate the diver at all times by boaters.

The reel 10 has a first substantially rectangular elongated flat member or top 14, a second substantially rectangular elongated flat member or bottom 16 and an interconnecting substantially rectangular flat core member 18 for maintaining the top and bottom members in a parallel spaced apart relationship. The interconnecting member 18 is attached to both members 14 and 16 along their longitudinal axis and equally spaced from each end. The shape of the reel 10 and in particular the width of the reel allows maximum contact of the reel between the arm or leg providing the desired stability on the diver. The rounded corners of both the top 14 and the bottom 16 members provide both a smooth passage to the water and also reduce the possibility of the underwater suit from being torn by sharp corners.

In the preferred embodiment, the reel 10 is an unitary molded member of a plastic material. Nylon was selected in the preferred embodiment for its high resistance to the detrimental action of water, both salt and fresh, on most materials.

The reel 10 is securely attached to the diver by means of the two flexible straps 12 and 13. In the preferred embodiment these straps are also nylon because of its relative indestructibility in the diver's environment.

Each strap is placed in a strap receiving means 20 and 21 which are parallelly disposed and spaced apart on the bottom member 16. In the preferred embodiment these two strap receiving means are respectively placed near each end of the elongated bottom member 16 for better stability of the reel on the arm or leg. The receiving means 20 and 21 are recesses or slots which are substantially equal in width to the width of the straps 12 and 13 are positioned transverse to the longitudinal axis of the bottom member 16. The straps are recessed in the slot so as to be flush with the line side upper surface of the bottom so as not to interfere with the deployment of the line 22.

In one embodiment there is at one end of each strap an elongated ring 24 through which the other end 26 of the strap passes. The size of the opening in the ring is such so as to allow the strap to pass through with turning and yet be contained from slidably moving therein. Bonded to each strap at the other end 26 is a quick release fastener or hook means 28. Bonded on the same side of each strap as the hook means 28 and intermediate to the ends of the strap is the mating loop means 30. The diver, when securing the reel 10 to his forearm between the wrist and elbow, passes each strap 12 and 13 around his arm through their respective rings 24 and folds the strap back along itself bringing the hook 28 and loop means 30 into contact with each other forming a secure fastener.

The ring 24 functions to reduce the load on the hook and loop means by the added frictional force of the strap around the ring and folded back on itself. This action places a pure shear load on the hook and loop means instead of a shearing twisting load without the ring. The strength of hook and loop means is in shear and not in tension or twist. In addition, the ring functions as a pulley whereby the load is divided by the short strap permanently bonded around one side of the ring and the other end 26 of the strap passed through the ring and folded back on itself. This reduces the amount of the load applied to the hook and loop means than that which would be applied without the loop.

Referring to the shape of the reel 10 as illustrated in FIG. 6 there are several important features. The height (A) of the interconnecting member 18, FIG. 3, permits up to 100 feet of ⅛ inch diameter nylon floating line to be wound on the reel. However, the low profile creates less water resistance and does not snag as readily on underwater obstacles as does the previous devices. The rectangular shape does not allow the line 22 to easily unwind when the diver does not tie the line off. However, the rectangular shape allows the diver a one-handed operation of unwinding and winding the line around the reel. The shape is also similar to the shape of a cleat such as found on boats thus permitting easy tie off instead of opening pressure fittings or clamps.

In order to remove the line 22 from the reel 10, the diver must pull slack from the line leading away from the reel. This is necessary in order that the line 22 can be moved over the corners 40 of the substantially rectangular elongated upper member 14 as illustrated in FIG. 11. Three basic features of the shape of the reel 10 require the increase in the amount of slack before the line can be removed from the core.

1. The amount of slack needed to move the line over the corner 40 of the upper rectangular member 14 increases as the quantity of line 22 around the core 18 decreases. The difficulty of letting the line out increases as the amount of line off the reel increases. This helps to remind the diver not to release too much line. Once a significant amount of line has been released or unwound, the diver is likely to remain at a predetermined depth. This requires a high degree of control over how much line should be wound or unwound.

2. The amount of slack needed to move the line 22 over the corner 40 also increases as the angle 42 decreases relative to the top of the rectangular member 14. In normal diving conditions, the float drags behind the diver and thus creates a decreased angular relation to the top of the rectangular member. This is illustrated in FIG. 10.

3. The amount of slack needed to move the line 22 over the corner 40 also increases as the line angles further away from the corner over which it is being removed.

As previously indicated, the reel in the preferred embodiment is an integral molded nylon unit. In order to securely bond the straps 12 and 13 to the bottom member 16, the nylon strap is bonded under pressure to the member 16 in the strap receiving means by a vinyl adhesive. The adhesive on the hook means 28 and the loop means 30 is solvent activated by a methyl ethyl ketone and then vinyl adhesive is applied to both the hook means 28 and the loop means 30 and the straps 12 and 13. Again pressure is applied for approximately 24 hours to effect the bond. In a similar manner the ring 24 is secured to the straps 12 and 13. The ring is held in a loop of the strap which is folded over on itself and bonded with vinyl adhesive.

Referring to FIG. 7, there is illustrated in perspective form a modification of the reel of FIG. 6. The modification is directed to a pair of spring members 44 having one end 46 in the form of a loop securely attached respectively to each strap. The other end of the spring member forms another similar loop 48 for receiving the free end 26 of the straps 12 and 13.

The spring members 44 are used to attach the reel 10 to the diver's arm or leg and allows the reel 10 to stay on comfortably yet securely. It allows the diver 11 to easily attach the reel 10 with just one hand on either his bare arm or leg or over his wet or dry suit. It also allows the diver 11 to quickly remove the reel if necessary. Further it compensates for the different pressures underwater as well as functioning properly with sand and other foreign particles found in a diving environment.

The straps 12 and 13 on the reel 10 can be loosened so that the reel can be slid on the arm or leg. In the alternative the free ends 26 of the strap can be taken out of each of the loops 48 of the spring members 44 and the reel can then be put on directly by threading each strap around the arm or leg and through the appropriate spring loop 48. Once the reel is in place on the arm or the leg the free end 26 of each strap is pulled. As the slack in the strap is taken up by the spring members 44, the loops 46 and 48 of each spring member 44 are separated as shown in FIG. 10.

The round wire 50 of the one spring loop receiving the free end of the strap provides a smooth surface for the strap to slide over. As the one spring loop 48 moves away from the other spring loop 46, it slides against the strap 12 and not against the arm or leg. This feature helps prevent the spring means 44 from scratching or pinching the diver or tearing the diver's suit.

The diver needs to pull the free end 26 of the strap 12 with about half of the force with which each spring member 44 holds the reel 10 to the diver. The spring members 44 gives to the diver an easier method of adjusting the reel to his body. This is due to the fact the free end 26 of each strap 12 and 13 has to move two units of length for each unit of length that the corresponding spring member 44 loop moves. This is especially important when considering the rate at which force tending to separate the two loops 46 and 48 of each spring member increases as the angle between the two loops increases. The fact that the force rapidly increases as the angle between the loops approaches 180° gives the diver the assurance the reel will not slip off his arm by having the spring members open up too easily.

When the reel is secured on the diver, the spring members follow the contour of the arm or leg as illustrated in FIG. 10. This insures that the spring members do not snag on any other object when the diver is in the water.

In the preferred embodiment of the spring members as shown in FIGS. 8 and 9, the following features are significant aspects of the embodiment. The ends of the wire 52 are located inside the coiled portion 54 of the torsion spring to prevent the wire ends from snagging the diver or any other object. The U shaped ends of the wire 50 have a maximum width 56 across the sides of the U so to contact the inside of the coiled portion 54 of the spring member 44. By having the ends of the wire contact the inside of the coil, the load that the two spring loops 46 and 48 can carry is increased before the spring is damaged. The U shaped ends 52 carry a significant portion of the load. The vertical reaction contact force of the U shaped ends of the wires against the inside of the coil help support the spring loops. The combined effect of both the horizontal reaction contact force and the vertical contact force holds the spring loops in their proper place. Thus, the spring loops 46 and 48 are maintained parallel to the centerline of the coil even as the loops are separated thereby keeping the strap tracking in the center of the spring loop 48 as the spring loops are separated.

The side wires 58 of the spring loops are approximately perpendicular to the line of motion that the spring loops 46 and 48 produce as they first start to open. The strap 12 or 13 will have less tendency to slide down the side wires 58 as the spring loops start to open due to the fact as soon as the loops do separate, the strap would no longer see the side wires as a low point into which to slide. This structure keeps the strap tracking correctly.

In an alternative embodiment of the spring members, the inside diameter of the coil is relatively small. The wire ends are not bent in a U shape and thus go straight into the coil and rest against the inside walls of the coil. However, the characteristics of the spring loops remain as above.

There has thus been shown and described a diver's life line reel having an elongated rectangular shape which is secured to the arm or leg by a pair of spaced apart straps connected at one end to the reel by a spring member. The reel is an integral molded unit having a low profile but adapted to allow one hand operation to deploy and tie off the line by a diver under water.

What is claimed is:

1. An underwater diver's life line reel comprising:
 a pair of elongated flexible straps;
 a first rectangular elongated flat member having end edges transverse to the direction of length of said member;
 a second substantially rectangular elongated flat member parallel to and spaced from said first elongated member, said second elongated member having a pair of spaced apart recessed strap receiving means extending transversely to the direction of length of said member for respectively receiving said straps, said straps adapted to be secured in a spaced apart relationship around the extremity of the diver;
 an interconnecting substantially thin rectangular flat core member connected orthogonal to each elongated flat member for maintaining said elongated members in a parallel spaced apart relationship, said member having a length substantially less than the length of said elongated members and positioned midway between the long sides of said members and equally distant from each end of said members having the difference in length between said core and said members is substantially greater than the difference between the width of said members and the thickness of said core; and
 a length of line secured at one end thereof to said interconnecting core member and wound therearound, wherein said end edges of said first member cooperate with said line for preventing unintentional unwinding when said line is under tension.

2. An underwater diver's life line reel according to claim 1 wherein each of said flexible straps includes:
 a ring attached at one end, said ring adapted for receiving and passing the other end of said strap therethrough;
 hook means attached along the flat surface of said strap and adjacent the other end, and
 loop means attached along the same flat surface of said strap and spaced from said hook means, whereby said reel is secured about a diver's extremity by means of said other end of said strap passed through said ring and said hook and loop means are interconnectively secured together.

3. An underwater diver's life line reel according to claim 1 wherein each of said recessed strap receiving means is positioned adjacent the ends of said core member.

4. An underwater diver's life line reel according to claim 3 wherein each of said recessed strap receiving means has a width and depth substantially equal to the width and thickness respectively of said strap means.

5. An underwater diver's life line reel according to claim 1 wherein the length of said first and second elongated flat members are equal and the length of said core member is substantially one third the length of said elongated flat member.

6. An underwater diver's life line reel according to claim 1 wherein said first and second elongated flat members and said rectangular interconnecting member are an integral unitary plastic structure.

7. An underwater diver's life line reel according to claim 6 wherein said integral unitary plastic structure is molded nylon.

8. An underwater diver's life line reel according to claim 1 additionally including torsion spring means respectively attached to said straps adjacent said second elongated member for receiving the free end of said strap and compressively maintaining said reel securely about the diver.

9. An underwater diver's life line reel according to claim 8 wherein said torsion spring means comprises;
- a plurality of closely wound coils intermediate the ends of the spring wire, said coils having a constant internal diameter;
- a pair of loops for receiving said straps, said loops formed respectively by said wire ends, said loops having a long side parallel to and spaced from the axis of said coils, said loops normally in contact with each other along their long sides;
- U shaped means formed at the end of each of said wire ends, said U shaped means having a maximum width across the sides of said U equal to the internal diameter of said coils; and
- said U shaped means inserted with said coil for maintaining said loops normally in an abutting relationship.

* * * * *